Sept. 12, 1961    M. TEN BOSCH ET AL    2,999,390
NON-TUMBLING VERTICAL GYROSCOPE SYSTEM
Filed July 7, 1958    5 Sheets-Sheet 3

INVENTORS.
MAURITS TEN BOSCH
BY PAUL LANG
ATTORNEY

Sept. 12, 1961  M. TEN BOSCH ET AL  2,999,390
NON-TUMBLING VERTICAL GYROSCOPE SYSTEM
Filed July 7, 1958  5 Sheets-Sheet 5

INVENTORS.
MAURITS TEN BOSCH
BY  PAUL LANG

ATTORNEY

United States Patent Office 2,999,390
Patented Sept. 12, 1961

2,999,390
NON-TUMBLING VERTICAL GYROSCOPE SYSTEM
Maurits ten Bosch, White Plains, and Paul Lang, Katonah, N.Y., assignors to M. ten Bosch, Inc., Pleasantville, N.Y., a corporation of New York
Filed July 7, 1958, Ser. No. 746,970
14 Claims. (Cl. 74—5.34)

The present invention relates to a non-tumbling vertical gyroscope system.

Although the present invention is not limited thereto, it will be particularly described in its application to the use of gyroscope systems and control devices and particularly in fire control devices which will be effective in airborne craft and especially during aerial combat maneuvers, such as, dive bombing, loft bombing, including the "over the shoulder method" of release and air-to-air combat.

It is among the objects of the present invention to provide a control gyroscope system, which will be effective during violent aerial combat maneuvers, such as, dive bombing, loft bombing and air-to-air combat and which will reliably give an accurate measurement of vertical direction during aerial combat techniques and throughout violent twists, turns and other maneuvers of the aircraft, particularly in arcuate or circular maneuvers in vertical planes.

Another object is to provide a small, compact reliable non-tumbling gyroscope system which will determine vertical direction to a high degree of accuracy in spite of repeated and violent maneuvers of the aircraft.

Another object of the present invention is to provide a novel compact small size reliable non-tumbling gyroscope control unit particularly designed for aircraft which will eliminate any tendency for gimbal lock and which will permit ready, effective control operation of the gyroscope without restriction on the pitch or roll of the aircraft.

Still further objects and advantages will appear in the more detailed description set forth below, it being understood, however, that this more detailed description is given by way of illustration and explanation only and not by way of limitation, since various changes may be made by those skilled in the art without departing from the scope and spirit of the present invention.

In accomplishing the above objects, it has been found most suitable according to one embodiment of the invention to provide a vertical gyroscope unit which contains two basic gyroscope rotors superimposed one above the other with parallel spin axes.

The gyroscope rotors are mounted for rotation about mutually perpendicular tilt axes which are orthogonal to the respective spin axes.

This assembly is connected to the aircraft by a three-axis gimbal system whose successively perpendicular axes are a horizontal roll axis, a horizontal pitch axis, and an aircraft roll axis.

In the preferred form, the upper and lower gyroscope rotors are mounted so that the pitch gyroscope is positioned directly above the roll gyroscope with the spin axes being substantially aligned in the vertical and with the tilting axis of the upper pitch gyroscope being positioned longitudinally of the aircraft while the tilt axis of the lower roll gyroscope is positioned transversely of the aircraft.

The two rotors need not necessarily be mounted above one another.

Both rotors should have their spin axes parallel and their mutually perpendicular tilting axes be mounted upon the same platform, gimbal, or support.

Each of these axes are mounted in a common level platform or inside roll or level gimbal.

This inside gimbal or level platform will in turn be mounted in a direction parallel to the mounting of the upper pitch gyroscope onto an intermediate pitch gimbal which also will be common to both gyroscopes.

The intermediate gimbal will then be mounted on the horizontal pitch axis to an outside or outermost roll gimbal which will be enclosed in the outside housing.

To summarize, the upper and lower pitch and roll gyroscopes which are mounted with their spin axes substantially aligned in vertical direction are received within a common inside gimbal, an intermediate pitch gimbal and an outside outer roll gimbal, each one of which is common to both the upper pitch and the lower roll gyroscopes.

The upper and lower gyroscopes are also provided with electrical connections associated with E-type transformers which in turn will transmit signals to servo systems provided with electric motors and gearing arrangements to create error signals which will serve to maintain the axes of the gyroscopes in their original vertical position regardless of the position of the aircraft.

In the preferred form of the rotors, the rotors are constrained around their tilting axes by feeding suitable tilt axis error signals to torquers operating around the horizontal roll and pitch axes which are at right angles to each other.

In such an arrangement the error signal measured around the horizontal roll axis will control and operate a servo system including a motor on the aircraft roll axis while causing the pitch axis to remain parallel to the plane of the tilting axes.

The required amplifiers for the servo-system are positioned in the available small space within the housing of the gyroscope unit.

As a result of this arrangement, an extra degree of freedom provided about the horizontal roll axis will completely eliminate any tendency toward a gimbal lock and the entire gyroscope unit will operate without limit on the pitch and roll outputs.

Although the construction of the accelerometer forms no part of this invention, the gyroscope unit will be provided with three integrating accelerometers, mounted for sensitivity along the axes of the vertically stabilized coordinate system maintained by the gyroscope system.

If the inner platform drifts out of horizontal, the accelerometers will provide error signal torques to react against the gyroscopes about their respective tilting axes in such a direction as to precess or erect the platform back into the horizontal plane.

This system may use the outputs of the horizontal accelerometers with a cut-out when the aircraft maneuvers become too violent.

There will also be a third, or vertical accelerometer which will provide that the system may remain continuously operative.

This system requires an airspeed input of medium accuracy which may be set manually or furnished with information from an airspeed meter.

A manual setting would not require adjustment during aircraft maneuvers.

The system essentially eliminates the effect of aircraft accelerations.

In the preferred arrangement, the non-tumbling vertical gyroscope system having two gyroscope rotors with angular moments of 40 in. oz. sec. will determine the vertical direction to an accuracy of ±½° during aircraft maneuvers.

The gyroscope unit will weigh about 13 pounds, exclusive of a power supply for the amplifiers.

It will require a three phase 115 volt 400 cycle supply and will consume about 60 watts.

The starting power will be 80 watts.

With the foregoing and other objects in view, the invention consists of the novel construction, combination and arrangement of parts as hereinafter will be more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
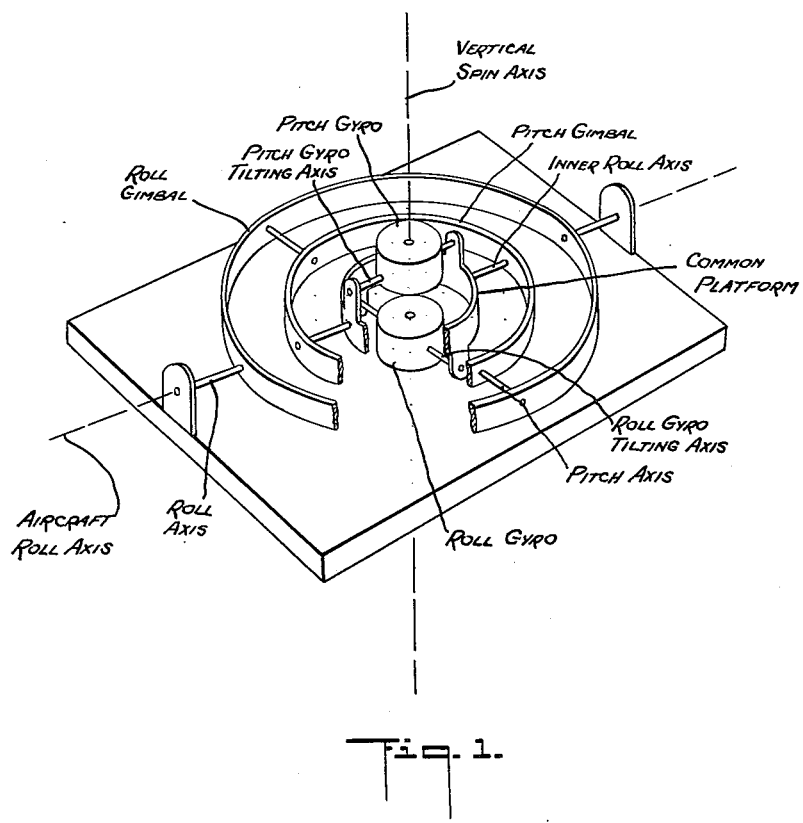
FIG. 1 is a perspective diagrammatic view in partial section of one form of non-tumbling vertical gyroscope according to the present invention showing a pitch and roll gyroscope in superimposed relationship with a common platform and with a common pitch gimbal and a common roll gimbal.

Referring to the diagrammatic showing of FIG. 1 there is diagrammatically illustrated a gyroscope unit with an upper pitch gyroscope and a lower roll gyroscope with their vertical spin axes aligned but with the pitch gyroscope tilting axis being transverse to the roll gyroscope tilting axis.

It is of course possible to have the pitch and roll gyroscope side by side but the superimposed relationship has been found to be most satisfactory. The pitch and roll gyroscopes are mounted on a common platform which in turn is mounted by an inner roll axis upon a pitch gimbal.

The pitch gimbal is mounted by a pitch axis transverse to the inner roll axis upon an outer roll gimbal which outer roll gimbal is in turn mounted so that its roll axis will be aligned with the aircraft roll axis.

FIGS. 2 to 6 show the vertical gyroscope arrangement of FIG. 1 embodied in a specific construction with the upper pitch gyroscope C being positioned above the lower roll gyroscope D.

These vertical gyroscope units C and D each have a synchronous speed rotor having an angular momentum of $2.85 \times 10^6$ gm-cm.$^2$/sec.

These rotors are constructed to minimize mass shift due to thermal effects and are also hermetically sealed.

Each individual gyroscope is provided with miniature ball bearings which support the rotor housing inside of and upon the inner roll level platform gimbal S in the pitch gimbal F.

The pitch gimbal F may consist of a thin spherical shell with stiffening flanges or it may consist of a ring with its material selected to match the thermal expansion of the rotor housing C to prevent balance changes about the sensitive axes due to temperature variations.

Besides supporting the rotor housing C, this gimbal F also supports the pitch erection accelerometer X (see FIG. 2), the pitch torquer H, and the pick-off for roll servo operation J.

The suspension of the pitch gimbal F in the outer roll gimbal K is also achieved in a similar manner.

Figure 5:
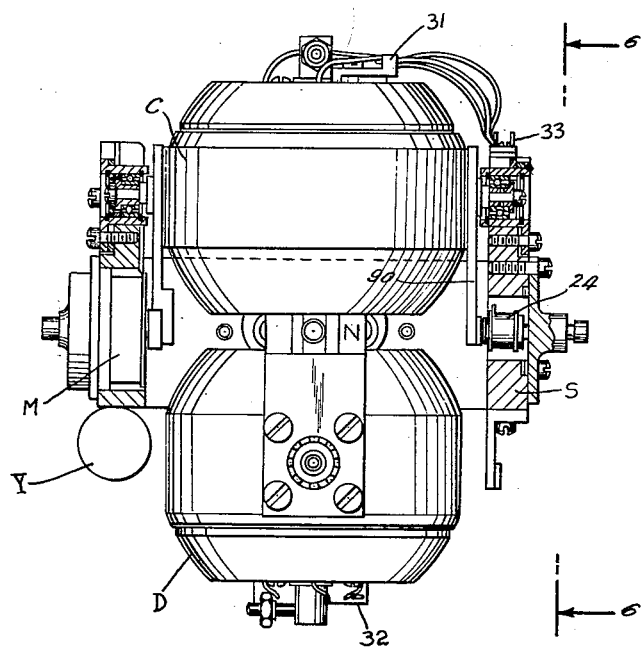
FIG. 5 is a side elevational view taken upon the line 5—5 of FIG. 4.

The outer roll gimbal K carries the pitch synchro L, and the platform gimbal S carries the tilting axis roll erection torquer M and the roll accelerometer Y (see FIG. 5).

As is the case with the pitch gimbal F, the material of the outer roll gimbal K will also be selected properly to compensate for thermal effects along the pitch axis.

The other important axes are the outer gimbal roll axis (see FIG. 1) and the inner roll axis R.

Figure 2:
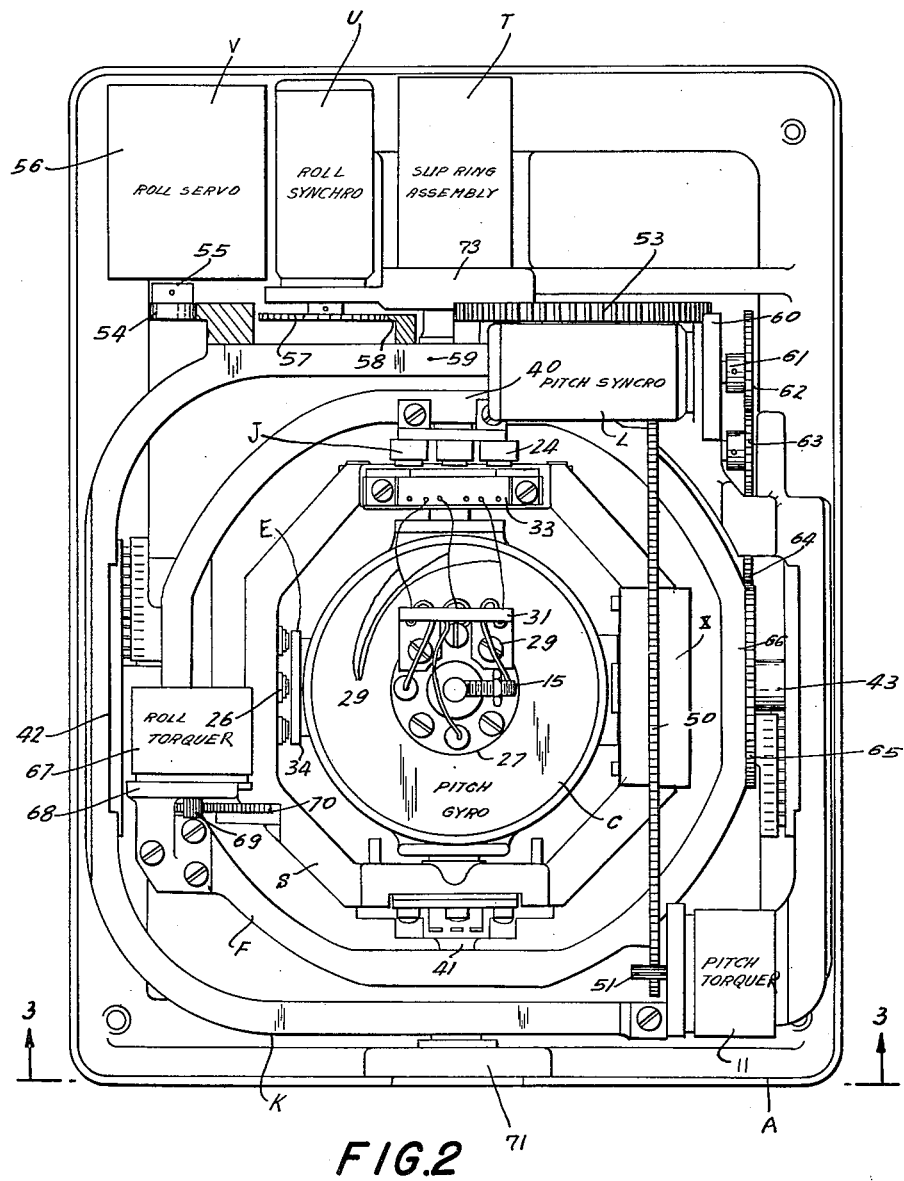
FIG. 2 is a top plan view showing a gyroscope arrangement as applied to a double rotor gyroscope.
Figure 3:
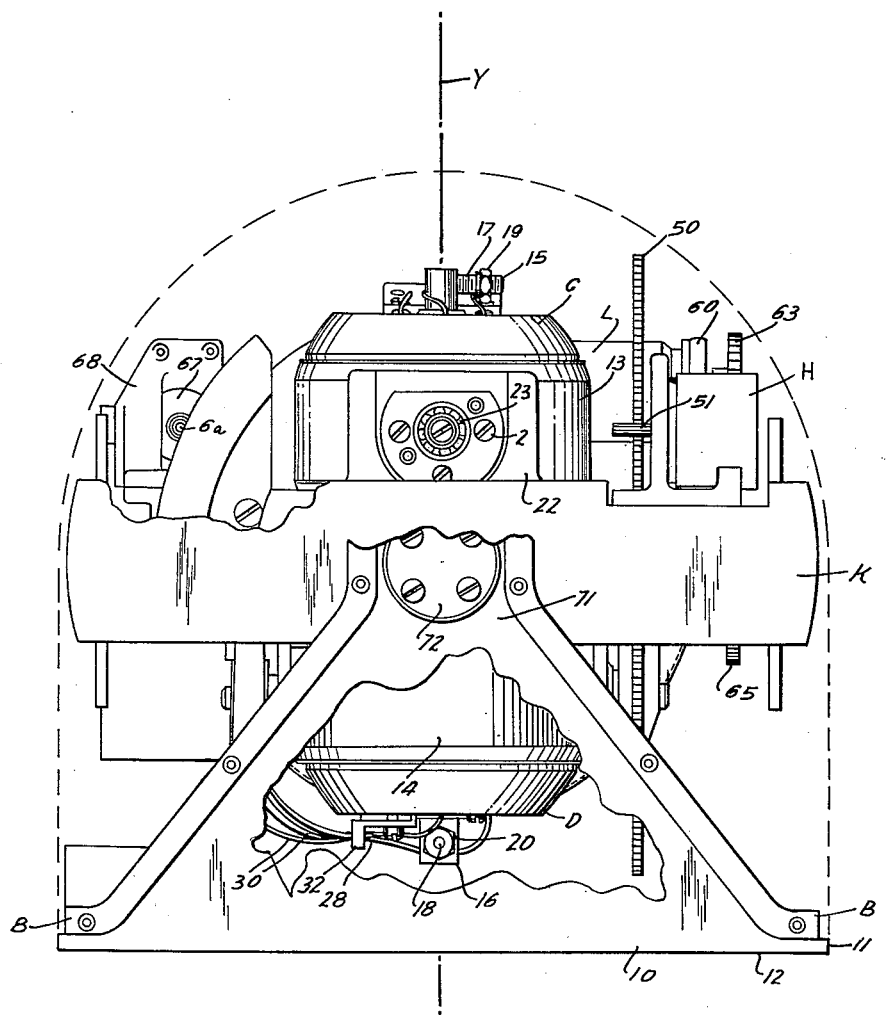
FIG. 3 is a side elevational view taken upon the line 3—3 of FIG. 2, partly broken away to show the interior mountings.

Referring to FIGS. 2 and 3, the feet B are mounted upon a base 10 which has its faces 11 and 12 finished parallel to the roll axis for installation purposes.

The upper gyroscope C has a housing 13 and the lower gyroscope D has a housing 14 and each have substantially the same vertical spin axis Y (see FIG. 3).

Mounted on the top of the housing 13 and on the bottom of the housing 14 on the upper and lower gyroscopes C and D are the balance adjustments 15 and 16, each of which have a screw 17 and 18 and an adjusting nut 19 and 20 to give balance adjustment.

The shaft 21 of the upper gyroscope is mounted in the upward extension 22 of the level platform or inside roll gimbal S.

Figure 7:
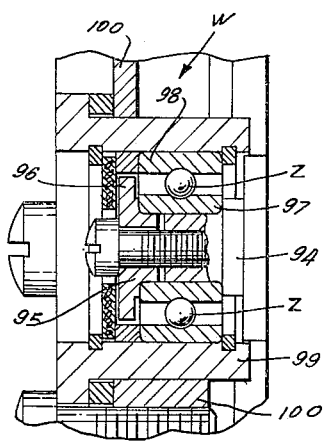
FIG. 7 is an enlarged fragmentary sectional view showing one of the tilt bearings upon an enlarged scale as compared to FIGS. 2 to 6.

Associated with the shaft 21 is the ball bearing structure, as shown in FIG. 7.

There are three diametrically opposite bearing structures 21—22—23 for each gyroscope aligned with the tilting axes, respectively.

Each gyroscope will also have a connection from one side of its bearing shaft to an E-type transformer construction 24 and from the diametrically opposite side, there will be a torquer connection to resist the tendency of the gyroscope to drift, due to friction and the earth's rotation.

The lower transformer arrangement 26 will actuate the roll torquer arrangement.

It will be noted that the top of the pitch gyroscope C at 27 and the bottom 28 of the roll gyroscope D are provided with a plurality of electrical leads 29 and 30, respectively, which pass through the angle members 31 and 32 to the elements 33 and 34.

These leads are the power leads from gyroscope motors.

These arrangements thus far described are all positioned inside of the inner roll or level platform gimbal S.

This gimbal S in turn is mounted inside of the intermediate or pitch gimbal F by means of the diametrically opposite bearings at 40 and 41 (see FIG. 2).

In turn the intermediate gimbal F is mounted by the bearing structures 42 and 43 at diametrically opposite points on the outside or outer roll gimbal K.

The torquer arrangements are best shown in FIGS. 2 and 3.

On the pitch gimbal F there is mounted a gear ring 50 which is driven by means of a small gear shaft 51 from the pitch torquer motor H (see FIG. 3).

The roll gimbal K has mounted thereon the ring gear 53 which is driven by means of the small gear or pinion 54 from the shaft 55 of the roll servo motor 56.

The roll synchro U will be driven by the gear 57 from the ring gear 58 which is mounted on the side 59 of the outside roll gimbal K.

The pitch synchro L is mounted on the bracket 60 and its shaft 61 is driven by the gear 62 which in turn is driven by the gears 63, 64 and 65.

The synchro L—U are signal transmission devices.

The gear 65 will be mounted on the intermediate gimbal F at 66 as shown in FIG. 2.

The roll synchro U is mounted rigidly on the outside housing A, while the pitch synchro L is mounted rigidly on the outside roll gimbal K.

The roll torquer motor 67 is mounted on the bracket 68 and drives the gear shaft 69 which in turn drives the gear 70.

The outer gimbal K is mounted upon the portion 71 of the frame structure at the bearing 72 as well as upon the diametrically opposite structure 73.

Figure 4:
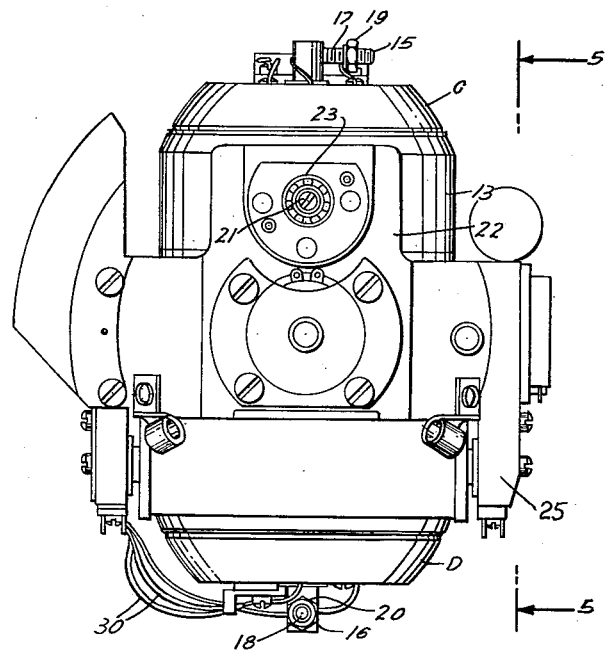
FIG. 4 is a side elevational view similar to FIG. 3 but with the brackets removed so as to more clearly show the gyroscope arrangements.
Figure 6:
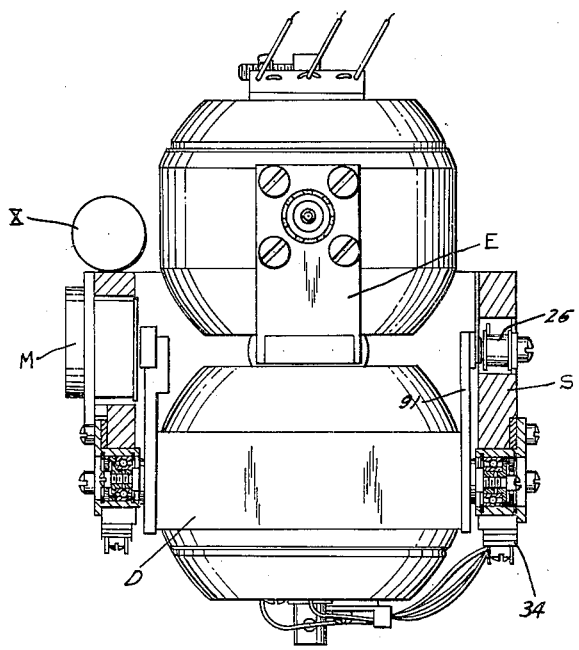
FIG. 6 is a side elevational view taken upon the line 6—6 of FIG. 5 with part of the gimbal broken away.

In the views of FIGS. 4 to 6, the outer structure is removed and the depending arms 90 on the upper gyroscope C and the upwardly extending arm 91 on the lower gyroscope D are shown, which cooperate with the E- shaped transformers 24 for the upper gyroscope and 26 for the lower gyroscope.

As shown in FIGS. 4 to 6, these E-transformers are mounted on the inside roll gimbal S.

Each axis of the gyroscope C and D of the gimbals S, F, and K are provided with ball bearing arrangements such as shown in FIG. 7.

These arrangements include a stub shaft connection 94 which connects with the inside sleeve 95 having the outer collar flange 96.

This collar or flange holds its position in the inside element 97 of the ball bearing unit Z.

The outer race element 98 is held in position in the outer bearing structure 99 which in turn is mounted in the frame structure 100.

By providing these compact small light weight bearings at each shaft, the friction to be overcome is reduced to a minimum.

In operation, if the carrying vehicle rotates about an axis which has a component parallel to the roll axis (see FIG. 1), the angular momentum of gyroscope D will maintain the spin axis Y vertical and maintain the platform S in a horizontal plane.

The infinitesimal relative angular displacement of gimbal F and the platform S will cause an error signal to be generated in the E-transformer 24 which will excite the roll servo motor 56 and permit the frame structure 71 to rotate about the gimbal system composed of K, F, and S.

Hence if the gyroscope spin axis Y is vertical, the pitch axis (see FIG. 1) will be maintained at all times in a horizontal plane.

This maintains the proper references for the measurement of pitch and roll while maintaining the vertical for all possible maneuvers of the aircraft.

A similar arrangement is effective in connection with the roll torquer arrangement.

It is thus apparent that the present applicant has provided a most effective non-tumbling vertical gyroscope unit connected to the aircraft by a three-axis gimbal system which will assure that the gyroscope spin axes will always be maintained in vertical direction regardless of the violent maneuver of the aircraft during dive bombing, loft bombing and air-to-air combat.

The torquer arrangements will be effective promptly and effectively to overcome frictional effects and to hold the spin axes of the gyroscopes in their original perpendicular position without any danger of their tumbling to a position 180° apart therefrom.

There will be an elimination of any gimbal lock and the gyroscope will operate without tumbling throughout most violent, pitching, rolling or acrobatic movements of the aircraft.

To give typical dimensions and specifications of a gyroscope arrangement according to the present invention:

Gyroscope rotor:
  Speed _____ 24,000 r.p.m.
  Angular momentum_____ $2.8 \times 10^6$ gm.-cm./sec.$^2$.
  Voltage _____ 115 v., 3 phase, 400 c.p.s.
Freedom of axes:
  Gyro rotor tilting_____ ±20°.
  Pitch gimbal_____ ±110°.
  Outer roll gimbal_____ unlimited.
Dimensions:
  Vertical gyroscope unit___ 4″×4″×4½″.
  Amplifier unit_____ 4″×4″×2½″.
Weight:
  Vertical gyroscope unit__ 4¼ lb.
  Amplifier unit_____ ¾ lb.
Volume:
  Vertical gyroscope unit__ 56½ in.$^3$.
  Amplifier unit_____ 36 in.$^3$.
Environmental conditions:
  Ambient temperature_____ −54° C. to +100°C.
  Altitude _____ unlimited.
  Aircraft maneuvers_____ unlimited freedom.

To summarize in the preferred form of the present invention there are two spinning rotors, each with a housing carrying the rotor, a pitch gimbal carrying the housings and a roll gimbal carrying the pitch gimbal with a final structure rigid with the vehicle carrying the roll gimbal.

The maximum effectiveness of the control system is when the longtiudinal axis of the vehicle approaches or becomes coincidental with the vertical spin axis of the gyroscope in steep dives.

With the normal gyroscope there is nothing which prevents a tumbling effect, with the result that the gyroscope will be 180 degrees or a multiple of 180 degrees out of line and thus lose its control function.

The present gyroscope unit, however, has an anti-tumbling control which prevents such an out-of-line position.

With the present gyroscope arrangement, when the longitudinal axis of the vehicle approaches or becomes coincidental with the vertical spin axis of the gyroscope, the take-up control signal will cause motion around the outer roll axis so that there will be sufficient motion to reduce the error signal to zero.

To give an example, if we assume that the vehicle or aircraft is to perform an inside loop without yaw or other rotation of the aircraft about its vertical axis, the spin axes of the gyroscopes will remain parallel to the fixed axis perpendicular to the earth, and will thereby attempt to maintain a platform to which they are coupled parallel to the plane in which lies the direction of forward flight at the beginning of maneuvering to be considered, the plane being perpendicular to the axis which is vertical or perpendicular to the earth, if the roll and pitch servo rates are not sufficient.

In the gyroscope of the present invention, the angle which occurs as a result of insufficient roll servo rate also appears at an angle between the roll gyroscope and cardan and between the cardan of the pitch gyroscope and its platform.

The arrangement of the present invention serves to limit this angle to as small a value as possible and the roll servo rate requirement can become quite large.

In order therefore to maintain the level axis of the platform parallel to a plane perpendicular to the vertical to the earth, it is necessary to provide sufficient pitch servo rate about the cross level axis of the platform and the pitch axis of the roll cardan.

As a result, if the aircraft is performing an inside loop in a vertical plane without yaw or roll disturbances until the roll axis of the cardan is coincidental with the air axis perpendicular with the earth, then in such instance, the roll cardan will be beyond the 90° position with respect to the platform, and the servo will be out of phase with the signal and hence the roll cardan will be rotated at the maximum speed.

In effect, by providing larger rates and using faster servo motors, the error signal created by motion in yaw or displacement is quickly reduced to zero particularly as the fore and aft axis of the aircraft approaches the spin axis.

The most important effect achieved by the present arrangement is that the error signal created between the inner roll gimbal and the pitch gimbal keeps the pitch axis and the inner roll axis in a horizontal plane.

In the embodiment of FIGURES 2 to 7, the housings for each of the rotors move relative to one another.

In operation the error signal does not force the pitch gimbal backwardly but rather rotates the outer roll gimbal until the pitch gimbal is again in the horizontal plane and thus the error signal causes rotation in space of everything enclosed within the pitch gimbal.

While the vertical is maintained by the error signal or signals, the entire arrangement is being spun around the vertical axis until the pitch axis is horizontal again.

The effect is accomplished by causing the axis of the outer roll gimbal to be a high speed spin axis developing a high rate of rotation.

The roll and pitch gyroscopes C and D will both have vertically aligned spin axes and their housings will be connected by tilting axes to the inner roll gimbal or the horizontal platform. Then the inner roll gimbal or horizontal platform will be connected by the inner roll axis perpendicular to the tilting axis to the intermediate pitch gimbal.

The intermediate pitch gimbal in turn will be connected by the pitch axis to the outer roll gimbal which is in turn connected along an axis parallel to, or aligned with, the aircraft roll axis to the aircraft structure.

The control system in this two-rotor arrangement serves to keep the pitch axis and the inner roll axis in a horizontal plane and this is accomplished by the error signal created when the plane approaches vertical in yaw or in any condition where the aircraft roll axis is not horizontal and where an error signal is created by any yaw in the movement in the aircraft.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A non-tumbling vertical gyroscope unit having superimposed pitch and roll gyroscopes and common inside level platform, intermediate pitch and outside roll gimbals common to both gyroscopes, said superimposed gyroscopes having substantially common vertical spin axes and perpendicular respective tilting axes and restoring torquer arrangements actuated by deviation of the platform axes from the horizontal to restore said platform axes to the horizontal, said gyroscopes being positioned directly together in superimposed position with their spin axes vertically aligned and with the bottom of the pitch gyroscope being directly above the top of the roll gyroscope and said common platform consisting of a shell encircling and enclosing the lower part of the pitch gyroscope and the upper part of the roll gyroscope and accelerometers positioned upon said platform and gimbals mounted for sensitivity parallel to the axes of the vertically stabilized coordinate system to react against the gyroscopes about their respective tilting axes in such a direction as to precess and erect the platform back into the horizontal plane.

2. A non-tumbling vertical gyroscope unit having superimposed pitch and roll gyroscopes and common inside level platform, intermediate pitch and outside roll gimbals common to both gyroscopes, said superimposed gyroscopes having substantially common vertical spin axes and perpendicular respective tilting axes and restoring torquer arrangements actuated by deviation of the platform axes from the horizontal to restore said platform axes to the horizontal, said last mentioned arrangements including E-transformers positioned inside of the gimbal for creating suitable error tilt axis signals and torquers operating around the horizontal roll and pitch axes actuated by said tilt axis error signals, said gyroscopes being positioned directly together in superimposed position with their spin axes vertically aligned and with the bottom of the pitch gyroscope being directly above the top of the roll gyroscope and said common platform consisting of a shell encircling and enclosing the lower part of the pitch gyroscope and the upper part of the roll gyroscope and accelerometers positioned upon said platform and gimbals mounted for sensitivity parallel to the axes of the vertically stabilized coordinate system to react against the gyroscopes about their respective tilting axes in such a direction as to precess and erect the platform back into the horizontal plane.

3. A non-tumbling vertical gyroscope unit having superimposed pitch and roll gyroscopes and common inside level platform, intermediate pitch and outside roll gimbals common to both gyroscopes, said superimposed gyroscopes having substantially common vertical spin axes and perpendicular respective tilting axes and restoring torquer arrangements actuated by deviation of the platform axes from the horizontal to restore said platform axes to the horizontal, said triple gimbal arrangement being positioned between the pitch and roll gyroscopes with the inside gimbal carrying the gyroscopes and the outside gimbal providing a connection to a fixed housing, said gyroscopes being positioned directly together in superimposed position with their spin axes vertically aligned and with the bottom of the pitch gyroscope being directly above the top of the roll gyroscope and said common platform consisting of a shell encircling and enclosing the lower part of the pitch gyroscope and the upper part of the roll gyroscope and accelerometers positioned upon said platform and gimbals mounted for sensitivity parallel to the axes of the vertically stabilized coordinate system to react against the gyroscopes about their respective tilting axes in such a direction as to precess and erect the platform back into the horizontal plane.

4. A non-tumbling vertical gyroscope unit having superimposed pitch and roll gyroscopes and common inside level platform, intermediate pitch and outside roll gimbals common to both gyroscopes, said superimposed gyroscopes having substantially common vertical spin axes and perpendicular respective tilting axes and restoring torquer arrangements actuated by deviation of the platform axes from the horizontal to restore said platform axes to the horizontal, said triple gimbal arrangement providing successively perpendicular axes corresponding to the horizontal roll, the horizontal pitch and the aircraft roll, said gyroscopes being positioned directly together in superimposed position with their spin axes vertically aligned and with the bottom of the pitch gyroscope being directly above the top of the roll gyroscope and said common platform consisting of a shell encircling and enclosing the lower part of the pitch gyroscope and the upper part of the roll gyroscope and accelerometers positioned upon said platform and gimbals mounted for sensitivity parallel to the axes of the vertically stabilized coordinate system to react against the gyroscopes about their respective tilting axes in such a direction as to precess and erect the platform back into the horizontal plane.

5. A non-tumbling vertical gyroscope unit having superimposed pitch and roll gyroscopes and common inside level platform, intermediate pitch and outside roll gimbals common to both gyroscopes, said superimposed gyroscopes having substantially common vertical spin axes and perpendicular respective tilting axes and restoring torquer arrangements actuated by deviation of the platform axes from the horizontal to restore said platform axes to the horizontal, each of said arrangements being provided with a gearing arrangement to be driven to restore the respective gimbals and roll torquer and pitch torquer motors actuated by error signals created by said arrangements to reduce the error signals to zero, said gyroscopes being positioned directly together in superimposed position with their spin axes vertically aligned and with the bottom of the pitch gyroscope being directly above the top of the roll gyroscope and said common platform consisting of a shell encircling and enclosing the lower part of the pitch gyroscope and the upper part of the roll gyroscope and accelerometers positioned upon said platform and gimbals mounted for sensitivity parallel to the axes of the vertically stabilized coordinate system to react against the gyroscopes about their respective tilting axes in such a direction as to precess and erect the platform back into the horizontal plane.

6. A gyroscope system having roll and pitch gyroscopes and a common inside platform and gimbal consisting of a shell encircling said gyroscopes, with a vertical spin axis, said system indicating deviation of the vehicle in pitch and roll, said system being of the type with each gyroscope having a spinning rotor and a housing enclosing said rotor, a pitch gimbal carrying said housing and a control gimbal carrying the pitch gimbal and a controlled arrangement to maintain the axes connecting the pitch gimbal with the housing and the pitch gimbal with the roll gimbal in a horizontal plane at all times, said gyroscopes being positioned directly together in superimposed position with their spin axes vertically aligned and with the bottom of the pitch gyroscope being directly above the top of the roll gyroscope and said common platform consisting of a shell encircling and enclosing the lower part of the pitch gyroscope and the upper part of the roll gyroscope and accelerometers positioned upon said platform and gimbals mounted for sensitivity parallel to the axes of the vertically stabilized coordinate system to react against the gyroscopes about their respective tilting axes in such a direction as to precess and erect the platform back into the horizontal plane.

7. A gyroscope system having roll and pitch gyroscopes and a common inside platform and gimbal consisting of a shell encircling said gyroscopes, with a vertical spin axis, said system indicating deviation of the vehicle in pitch and roll, said system being of the type with each gyroscope having a spinning rotor and a housing enclosing said rotor, an intermediate pitch gimbal and an outside roll gimbal, and a restoring arrangement actuated by deviation of the connecting axes from the horizontal to restore said axes to the horizontal, said gyroscopes being positioned directly together in superimposed position with their spin axes vertically aligned and with the bottom of the pitch gyroscope being directly above the top of the roll gyroscope and said common platform consisting of a shell encircling and enclosing the lower part of the pitch gyroscope and the upper part of the roll gyroscope and accelerometers positioned upon said platform and gimbals mounted for sensitivity parallel to the axes of the vertically stabilized coordinate system to react against the gyroscopes about their respective tilting axes in such a direction as to precess and erect the platform back into the horizontal plane.

8. A gyroscope system having roll and pitch gyroscopes and a common inside platform and gimbal consisting of a shell encircling said gyroscopes, of the type with each gyroscope having a spinning rotor and a housing carrying said rotor, a pitch gimbal carrying the housing and a roll gimbal carrying the pitch gimbal and a structure rigid with the vehicle carrying the roll gimbal and error signal controlled means to maintain the connecting gimbal axes in a horizontal plane, said gyroscopes being positioned directly together in superimposed position with their spin axes vertically aligned and with the bottom of the pitch gyroscope being directly above the top of the roll gyroscope and said common platform consisting of a shell encircling and enclosing the lower part of the pitch gyroscope and the upper part of the roll gyroscope and accelerometers positioned upon said platform and gimbals mounted for sensitivity parallel to the axes of the vertically stabilized coordinate system to react against the gyroscopes about their respective tilting axes in such a direction as to precess and erect the platform back into the horizontal plane.

9. A vehicle gyroscope system having roll and pitch gyroscopes and a common inside platform and gimbal consisting of a shell encircling said gyroscopes, with each gyroscope having a rotor with a vertical spin axis and a housing carrying said rotor and bearings for the ends of said spin axis, a pitch gimbal carrying said housing, a roll gimbal carrying said pitch gimbal, and a carrying structure mounted on the vehicle carrying said roll gimbal means actuated by tendency of the vertical spin axis to deviate from the vertical spin axis to drive said gimbal to correct said deviation, said gyroscopes being positioned directly together in superimposed position with their spin axes vertically aligned and with the bottom of the pitch gyroscope being directly above the top of the roll gyroscope and said common platform consisting of a shell encircling and enclosing the lower part of the pitch gyroscope and the upper part of the roll gyroscope and accelerometers positioned upon said platform and gimbals mounted for sensitivity parallel to the axes of the vertically stabilized coordinate system to react against the gyroscopes about their respective tilting axes in such a direction as to precess and erect the platform back into the horizontal plane.

10. A vehicle gyroscope system having roll and pitch gyroscopes and a common inside platform and gimbal consisting of a shell encircling said gyroscopes, with each gyroscope having a rotor with a vertical spin axis and a housing carrying said rotor and bearings for the ends of said spin axis, a pitch gimbal carrying said housing, a roll gimbal carrying said pitch gimbal, and a carrying structure mounted on the vehicle carrying said roll gimbal means creating an error signal actuated by tendency of the vertical spin axis to deviate from the vertical and means to oppose the deviation from the vertical actuated by said error signal to reduce the error signal to zero, said gyroscopes being positioned directly together in superimposed position with their spin axes vertically aligned and with the bottom of the pitch gyroscope being directly above the top of the roll gyroscope and said common platform consisting of a shell encircling and enclosing the lower part of the pitch gyroscope and the upper part of the roll gyroscope and accelerometers positioned upon said platform and gimbals mounted for sensitivity parallel to the axes of the vertically stabilized coordinate system to react against the gyroscopes about their respective tilting axes in such a direction as to precess and erect the platform back into the horizontal plane.

11. An anti-tumbling gyroscope system having roll and pitch gyroscopes and a common inside platform and gimbal consisting of a shell encircling said gyroscopes, having a pitch gimbal and a roll gimbal, respectively provided with a pitch axis and a roll axis and means to maintain said axes on the same horizontal plane including means to create an error signal upon deviation from said horizontal plane and means to rotate the outer roll gimbal about the vehicle roll axis and the pitch gimbal about the vertical axis until the pitch axis is again in a horizontal plane, said gyroscopes being positioned directly together in superimposed position with their spin axes vertically aligned and with the bottom of the pitch gyroscope being directly above the top of the roll gyroscope and said common platform consisting of a shell encircling and enclosing the lower part of the pitch gyroscope and the upper part of the roll gyroscope and accelerometers positioned upon said platform and gimbals mounted for sensitivity parallel to the axes of the vertically stabilized coordinate system to react against the gyroscopes about their respective tilting axes in such a direction as to precess and erect the platform back into the horizontal plane.

12. A non-tumbling double vertical gyroscope unit for aircraft having superimposed pitch and roll gyroscopes with coinciding vertical spin axes, a common platform upon which the gyroscopes are rotatably mounted along pitch and roll tilting axes, an intermediate pitch gimbal upon which the platform is mounted upon an inner roll axis and an outside roll gimbal upon which said intermediate gimbal is rotatably mounted along the pitch axis, the outside gimbal being pivotally mounted upon the aircraft along the aircraft roll axis.

13. The unit of claim 12, E-type transformers being associated with the gyroscopes, and servo systems having motors and associated gears actuated from said transformers and torquer arrangements actuated from said servo systems to maintain the spin axes in vertical position.

14. A vertical gyroscope unit having two closely vertically adjuxtapositioned gyroscope housings with two basic pitch and roll gyroscopic rotors superimposed one above the other with aligned vertical spin axes, a common encircling inside platform gimbal, upon the upper and lower sides of which, said housings are mounted for rotation about mutually perpendicular tilt axes which are orthogonal to the respective spin axes, an intermediate pitch gimbal common to both gyroscopes encircling said platform gimbal, said inside platform gimbal being mounted on the intermediate gimbal in a direction parallel to the mounting of the pitch gyroscope onto the inside gimbal, an outer roll gimbal common to both gyroscopes, said intermediate gimbal being mounted on said outer roll gimbal, an outside housing upon which said outer roll gimbal is mounted, E-type transformers associated with said upper and lower gyroscopes, servo systems receiving signals from said E-type transformers, and torquers actuated by said servo systems to maintain the axes of the gyroscopes in their original vertical position.

References Cited in the file of this patent

UNITED STATES PATENTS

| | | |
|---|---|---|
| 1,324,477 | Tanner | Dec. 9, 1919 |
| 1,446,348 | Hort | Feb. 20, 1923 |
| 2,469,782 | Phair | May 10, 1949 |
| 2,584,876 | Haskins | Feb. 2, 1952 |
| 2,802,364 | Gievers | Aug. 13, 1957 |